3,010,994
SYNTHESIS OF GLUTAMIC ACID
FROM ACRYLONITRILE
Ryoji Iwanaga, Tokyo, Isamu Iwamoto, Kawasaki-shi, and Toichi Yoshida, Kamakura-shi, Japan, assignors to Ajinomoto Co., Inc., Tokyo, Japan, a corporation of Japan
No Drawing. Filed Aug. 22, 1956, Ser. No. 605,468
Claims priority, application Japan Aug. 29, 1955
2 Claims. (Cl. 260—534)

This invention relates to a new method for the production of glutamic acid from acrylonitrile which has recently been produced economically in large scale. A method of preparing glutamic acid from acrylonitrile and malonic esters is known, but malonic esters are too expensive to be used as a starting material for commercial production of glutamic acid. A method for the production of glutamic acid from acrylic esters has also been known which comprises treating acrylic esters with hydrogen and carbon monoxide to form alkyl-4-oxo-butyrate, and converting the produced ester to glutamic acid by Strecker's method or Bucherer's method. But acrylic esters are not so easily available as acrylonitrile.

An object of this invention is to provide a new method for the production of glutamic acid from acrylonitrile by the hydroformylation reaction. Possibility of the formation of β-cyanopropionaldehyde from acrylonitrile by hydroformylation was suggested by Adkins and Krsek (J. Am. Chem. Soc., 71, 3051 (1949)) but their experiments were unsuccessful because of the unstability of the intermediate material produced in the reaction. It is believed that β-cyano-propion-aldehyde, the intermediate material produced in the reaction, is very unstable and it can hardly be isolated and hence they failed in isolation.

We have found that β-cyano-propion-aldehyde is too unstable to be isolated from the reaction liquor. However, it has now been found and ascertained unexpectedly by our investigations that acrylonitrile is converted to β-cyano-propion-aldehyde by a yield as high as 70 mole percent by hydroformylation reaction, with substantially no simultaneous production of α-cyano-propion-aldehyde. We have further found that the β-cyano-propion-aldehyde present in the reaction liquor can be synthesized with no necessity of isolating from the reaction liquor by treating the aldehyde as it is with liquid hydrogen cyanide and ammonium solution thereby producing glutamic acid.

It may be supposed theoretically that when acrylonitrile is subjected to hydroformylation reaction under similar conditions as in the case of employing acrylic acid esters as the starting material, the following two types of aldehydes may be produced.

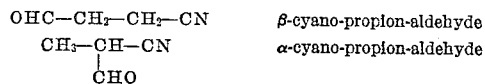

OHC—CH$_2$—CH$_2$—CN    β-cyano-propion-aldehyde
CH$_3$—CH—CN             α-cyano-propion-aldehyde
     |
     CHO If the product is a mixture of the aldehydes of these two types, then when the product is subjected to Strecker's synthesis for the production of amino-acid, a substantial amount of β-methyl-aspartic acid shall be produced in addition to glutamic acid.

However, the inventors have ascertained that α-cyano-propion-aldehyde which might be expected to be formed together with β-cyano-propion-aldehyde in the oxo-reaction of acrylonitrile was not substantially formed. Many experiments executed by the inventors have proved corresponding coincidence between the quantitative value of amino-nitrogen in the solution of amino-acid from the water-extracted portion obtained by Strecker synthesis and the quantitative value of glutamic acid in said solution determined by the action of glutamic acid decarboxylase. If α-cyano-propion-aldehyde is formed, there should be found excess of amino-nitrogen due to methylaspartic acid to be formed in the finally obtained aqueous solution containing glutamic acid. Above said expectation was found contrary to the fact really affirmed. Moreover, not only paper chromatogram of the obtained crystal but also that of the mother liquor i.e. the reaction mixture per se have shown the single spot having the Rf-value corresponding to glutamic acid, and no others.

According to this discovery, it has now been found that pure glutamic acid can be produced commercially by synthesis in an industrial scale by employing acrylonitrile as the starting material with yield sufficiently high for the industrial operation.

The process of this invention essentially comprises using acrylonitrile for the starting material and producing the aldehyde thereof as an intermediate product by a conventional hydroformylation reaction, and synthesizing the aldehyde produced in the reaction liquor without isolating the aldehyde therefrom by Strecker's method or Bucherer's method thereby producing glutamic acid.

This invention is illustrated hereunder by some examples, which are illustrative and not limiting this invention to these particular embodiments of this invention.

*Example 1*

A mixture of 150 ml. of benzene and 20.0 g. of pure acrylonitrile (380 millimoles) containing in admixture 0.8 millimoles of dicobalt-octacarbonyl as a catalyst and 0.8 millimoles of pyridine as a promoter, was placed in a stainless steel autoclave, having a 600 ml. capacity, and gas mixture (CO:H$_2$=1:1) was introduced at room temperature until the pressure gauge indicated 200 Kg./cm.$^2$, and then the autoclave was heated to a temperature of 130° C., which was maintained constant. Then shaking was started and continued until the pressure drop became almost not to be observed (about 40 min.). After the autoclave was cooled with tap water, the resulting brownish product was discharged from the autoclave. A portion of this product was analysed by the titration method using hydroxylamine hydrochloride solution. The cyanopropionaldehyde content in this solution was calculated and the conversion yield based on acrylonitrile was obtained. Similar experiments were carried out three times. The results in these experiments were 73.2, 77.6, 74.3 mole percent respectively.

To the main portion of above solution in a stainless steel autoclave was added 10 g. liquid hydrogen cyanide and 180 g. ammonia aq. solution (28%), and was shaken in a stainless steel autoclave for 30 minutes at 140–143° C. After cooling the autoclave, 45 g. sodium hydroxide was added and hydrolised. After removing ammonia, the resulting syrup was diluted with water and a portion thereof was taken to subject it to the Van Slyke Method in order to determine amino nitrogen. The calculated amino acid content in this solution was 45.8% of the theoretical based on acrylonitrile. Similarly two other experiments showed values of 49.6 and 49.1%.

The main portion of the solution in the last experiment was adjusted to pH 3.2 and 16.8 g. of DL-glutamic acid monohydrate was obtained, which showed 93% purity by the enzymic determination with glutamic acid decarboxylase, and only one spot corresponding to glutamic acid in the paperchromatograph.

*Example 2*

To a solution of 20 g. (0.376 mole) acrylonitrile in 160 ml. benzene, 0.5 mole percent of dicobaltoctacarbonyl and 1 mole percent of hydroquinone were added and the mixture was hydroformylated at 130° for 20 minutes under 150 Kg./cm.$^2$ of the initial pressure of hydrogen and carbon monoxide mixture ($H_2:CO=1:1$). The cyanopropionaldehyde formed was 70.0 mole percent based on acrylonitrile used. A similar experiment was carried out and showed a value of 78.5 mole percent. Then 230 ml. of aq. ammonia (28%) and 15 ml. of hydrogen cyanide were added and heated with shaking at 50° for 1 hr. After hydrolysing with sodium hydroxide, amino nitrogen was determined by the Van Slyke Method. The values of the aminonitrogen in the two experiments were 64.4 and 75.0 mole percent based on acrylonitrile. 32.0 g. and 38.0 g. of DL-glutamic acid monohydrate were obtained by treating the hydrolysate with cation exchange resin.

What is claimed is:

1. A synthetic process for producing glutamic acid from acrylonitrile in which acrylonitrile is hydroformylated in benzene solution with carbon monoxide and hydrogen in the presence of a cobalt catalyst, to produce β-cyanpropion aldehyde, and the reaction mixture containing the β-cyanpropion aldehyde is thereupon treated with hydrogen cyanide and ammonia, and finally hydrolyzed with caustic alkali whereby glutamic acid is produced.

2. A synthetic process for producing glutamic acid from acrylonitrile according to claim 1 which comprises dissolving acrylonitrile in benzene to form a 10 to 20% solution, adding thereto 0.5 to 1.0 mol percent of dicobaltoctacarbonyl as catalyst, introducing hydrogen and carbon monoxide into an autoclave containing said solution, heating said autoclave at a temperature within the range between 120° C. and 140° C. under 100 to 300 atmospheres for 10 to 40 minutes to produce β-cyanpropion aldehyde, discharging the reaction mixture containing the β-cyanpropion aldehyde out of the autoclave after cooling, adding liquid hydrogen cyanide and an aqueous solution of ammonia to said reaction mixture, heating said mixture at a temperature within the range between 50° C. and 150° C. for 30 to 60 minutes while agitating it, hydrolyzing the aminonitrile thus formed with caustic alkali, removing the benzene layer which separates after standing, and acidifying the remaining aqueous layer to a pH of 3.2 to precipitate glutamic acid.

References Cited in the file of this patent

FOREIGN PATENTS 839,801    Germany _____ May 26, 1952

OTHER REFERENCES

Adkins et al.: JACS, vol. 71 (1949), pp. 3051–5.
Fieser & Fieser: Organic Chemistry, 2nd ed. (1950), pp. 441–2.